United States Patent
Martins et al.

(10) Patent No.: US 6,438,275 B1
(45) Date of Patent: Aug. 20, 2002

(54) METHOD FOR MOTION COMPENSATED FRAME RATE UPSAMPLING BASED ON PIECEWISE AFFINE WARPING

(75) Inventors: Fernando C. M. Martins, Hillsboro; Arlene K. Kasai, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/296,451

(22) Filed: Apr. 21, 1999

(51) Int. Cl.[7] .................................................. G06K 9/32
(52) U.S. Cl. ........................ 382/300; 382/236; 345/610; 345/606; 345/607; 348/538; 348/451
(58) Field of Search .................................. 382/300, 295, 382/254, 275, 236, 252, 232, 299, 266, 269; 348/441, 537, 538; 345/606, 607, 610; 358/528, 428, 525; 708/290

(56) References Cited

U.S. PATENT DOCUMENTS

| | | | | |
|---|---|---|---|---|
| 5,027,203 A | * | 6/1991 | Samad et al. ................ | 358/104 |
| 5,027,205 A | * | 6/1991 | Avis et al. ................... | 358/140 |
| 5,933,547 A | * | 8/1999 | Dudon et al. ................ | 382/300 |
| 6,097,381 A | * | 8/2000 | Scott et al. .................. | 345/302 |
| 6,184,935 B1 | * | 2/2001 | Iaquinto et al. ............. | 348/441 |

OTHER PUBLICATIONS

Nieweglowski et al., "Motion Compensated Video Sequence Interpolation Using Digital Image Warping," 1994 IEEE, pp. V–205–V–208.

Chen et al., "A New Frame Interpolation Scheme For Talking Head Sequences," white paper, 4 pages.

Dudon et al., "Triangle–Based Motion Estimation and Temporal Interpolation," 1995 IEEE Workshop on Nonlinear Signal & Image Processing, 4 pages.

Nosratinia, Aria and Orchard, Michael T., "Optimal Warping Prediction for Video Coding," Proc. ICASSP–96, May 7–10, 1996, 4 pages.

Nieweglowski et al., "A Novel Video Coding Scheme Based on Temporal Prediction Using Digital Image Warping," 1993 IEEE, pp. 141–150.

* cited by examiner

*Primary Examiner*—Joseph Mancuso
*Assistant Examiner*—Yosef Kassa
(74) *Attorney, Agent, or Firm*—Blakely, Sokoloff, Taylor & Zafman LLP

(57) ABSTRACT

Interpolation of a new frame between a previous frame and a current frame of a video stream by motion compensated frame rate upsampling. The interpolation method includes identifying nodes and edges of objects such as triangles present in the previous frame, constructing a superimposed triangular mesh based on the identified nodes and edges, estimating displacement such nodes in the superimposed triangular mesh from the previous frame with respect to the current frame, and rendering the new frame based on the estimated displacement of nodes. Additionally, pixels of the previous frame and the current frame may be classified according to whether a pixel's value has changed from the previous frame to the current frame. This classification may be used during rendering to reduce overall processing time. Pixel-based forward motion estimation may be used to estimate motion of pixels between the previous frame and the current frame and the estimated motion may be used in estimating node displacement.

26 Claims, 7 Drawing Sheets

METHOD FOR MOTION COMPENSATED FRAME RATE UPSAMPLING BASED ON PIECEWISE AFFINE WARPING

BACKGROUND

1. Field

The present invention relates generally to processing of multimedia data signals and, more specifically, to interpolating frames in a video data stream.

2. Description

Digital video data streams can be processed by various types of electronic components, such as computers, digital televisions, digital video cameras, video conferencing equipment, etc. In order to ease the requirements for transmitting digital video from one component to another, the data is typically encoded and compressed according to one of several well known methods at the sending end of a communications path. This functionality is usually provided by an encoder within a first component. At the receiving end of the communications path, the encoded and compressed video stream is then typically decompressed and decoded. This functionality is usually provided by a decoder within a second component. The encoder and decoder for any given component are often combined into one unit as a video encoder/decoder, or video codec.

Various methods are known in the art for improving the quality of digital video as handled by video codecs. Generally, the quality of a video stream may be improved by increasing the resolution of each frame of a video stream, increasing the frame size, or by increasing the frame rate of the video stream. In one known method, called frame rate upsampling (FRU), fewer frames per second are transmitted from a sender to a receiver, but the receiver analyzes the received frames of the stream and generates new intermediate frames based on the analysis. When transmission happens in a fixed channel, fewer frames per second means that more bits will become available to encode each individual frame. This translates into fewer but sharper frames. The video quality is therefore improved due to the increased frame rate without the need for additional bandwidth for transmission of the added frames. In some cases, the transmitted frames may be sharper than before, so the overall transmission bandwidth may be approximately the same, but with FRU being performed by the receiver a larger image may be rendered.

Although FRU methods have been and continue to be developed, existing solutions exhibit a number of problems affecting image quality. Digital video streams rendered by a receiver after FRU processing often have noticeable block artifacts which detract from the image quality. For some video content, such as sports and music videos having a substantial amount of fast motion, FRU produces unsatisfactory results. In some instances, the newly interpolated frames are deemed to be visually unacceptable for fitting in to the video stream and must be discarded prior to rendering. In addition, the frame size and frame rates at which current FRU techniques are effective is limited. Therefore, there is a need in the digital video art for techniques that overcome these and other disadvantages.

SUMMARY

An embodiment of the present invention is a method of interpolating a new frame between a previous frame and a current frame of a video stream. The method includes identifying nodes and edges of triangles present in the previous frame, constructing a superimposed triangular mesh of the previous frame from the identified nodes and edges, estimating displacement of nodes in the superimposed triangular mesh from the previous frame to the current frame, and rendering the new frame based on the estimated displacement of nodes.

Another embodiment of the present invention is an apparatus for frame rate upsampling based on a previous frame and a current frame of a video stream. The apparatus includes a node and edge identification component to identify nodes and edges of triangles present in the previous frame, and a triangulation component to construct a superimposed triangular mesh of the previous frame from the identified nodes and edges. The apparatus further includes a node displacement estimation component to estimate displacement of nodes in the superimposed triangular mesh from the previous frame to the current frame, and a renderer to render the new frame based on the estimated displacement of nodes.

BRIEF DESCRIPTION OF THE DRAWINGS

The features and advantages of the present invention will become apparent from the following detailed description of the present invention in which.

DETAILED DESCRIPTION

Figure 1:
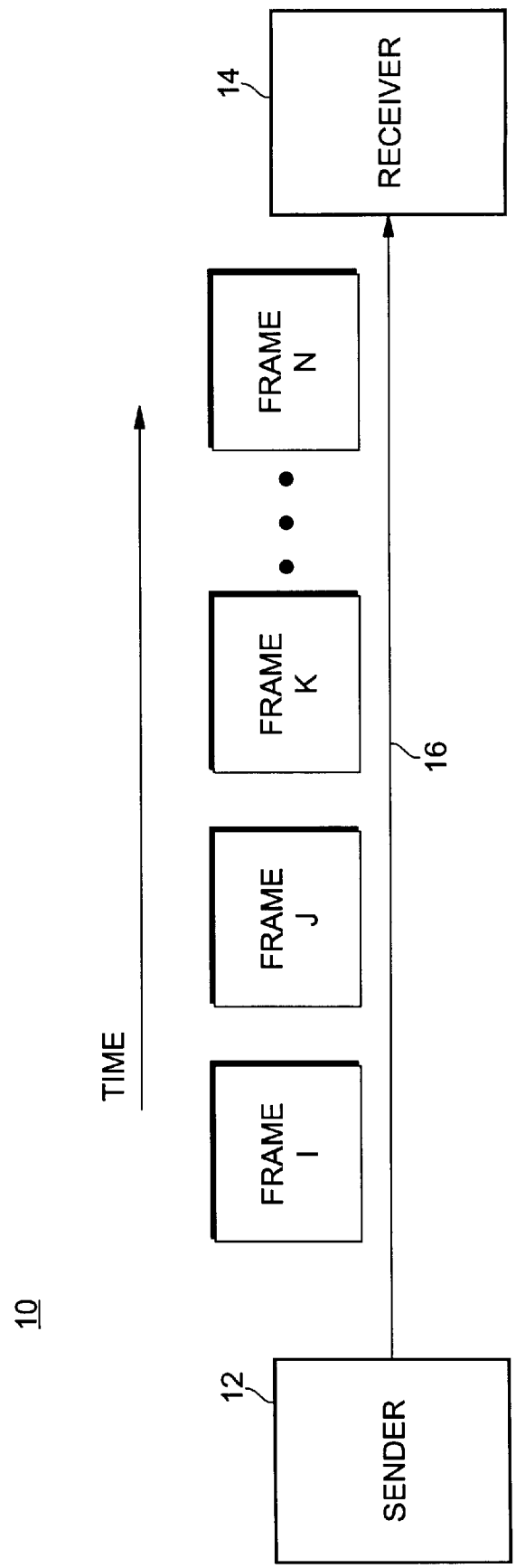
FIG. 1 is a diagram of a system of multimedia communication between a sender and a receiver over a communications path according to an embodiment of the present invention.

An embodiment of the present invention comprises a method and apparatus for performing motion compensated, pixel-based interpolation of frames in a digital video stream. Embodiments of the present invention provide improvements over the prior art for delivering better quality interpolated frames, a wider operating range in terms of frame rate and data rates, improved multiple frame interpolation quality, and better handling of scene changes and fast motion sequences. Embodiments of the present invention also mitigate the need for interpolation failure prediction, detection and recovery. Furthermore, embodiments of the present invention may be scaleable according to the available processing power of a host system.

Reference herein to "one embodiment" or "an embodiment" means that a particular feature, structure or characteristic described in connection with the embodiment is included in at least one embodiment of the present invention. Thus, the appearances of the phrase "in one embodiment" in various places throughout the specification are not necessarily all referring to the same embodiment.

A digital video processing technique called Frame Rate Upsampling (FRU) may be used to display and synthesize for later viewing temporally smoother video sequences. FRU enables visual quality improvement in low and medium bit-rate video communications by allowing the transmission of sharper images at lower frame rates followed by FRU processing at the receiving end of the communications path. Another application of FRU is on-demand slow motion generation for content transmitted at high frame rates. Embodiments of the present invention were developed to improve the overall quality of interpolated frames where FRU may be used. Embodiments of the present invention may reduce noticeable block artifacts produced by known prior art FRU implementations, reduce the number of interpolated frames considered "visually unacceptable" that are dropped by known prior art FRU implementations, and enable more consistent operation for highly dynamic content, such as music and sports videos, where known prior art FRU implementations have produced poor quality results. Further, embodiments of the present invention may enable operation beyond the known prior art FRU implementation's operating range of 20 to 300 kilobits per seconds (kbps) at a frame rate of 5 to 15 frame per second (fps) and enable synthetic slow motion of high data/frame rate content (e.g., at frame rates upwards of 20 fps).

Many of the artifacts generated by at least one known prior art FRU implementation are due to the block-based nature of the techniques used. The motion field produced by block motion estimation is only capable of capturing in-camera-plane translations—a two degrees of freedom motion. However, objects free to move in three dimensions (3D) require six degrees of freedom for proper motion representation. The association of this misrepresentation of motion with prior art rendering, that selects a best vector for block synthesis, often leads to misplaced blocks in the synthetic image that translate into blocky artifacts.

The drawbacks of the block-based rendering approach used in the prior art may be overcome by pixel-based algorithms that support distinct motion vectors for each pixel. Embodiments of the present invention employ triangular mesh warping by affine maps driven by constrained block based motion estimation. An affine mapping is a transformation that takes an input image and produces a warped version of that image while preserving colineation (lines in the original image are still lines in the warped image) and parallelism (parallel lines in the original image are parallel in the warped image). Mathematically an affine transform is represented by a 2×2 rotation/scaling matrix R and by a 2×1 translation vector T. The affine mapping is then defined by: x'=Rx+T; where x represents pixel coordinates in the original image and x'represents the pixel coordinates of the same pixel in the warped image. If a node of a triangle (or a rectangle, for example) is moved, the warping produced is always affine because the lines that form the triangle are preserved in the warp process.

The affine warping associated with each triangle in a mesh implicitly provides a distinct motion vector for each pixel of that triangle. This causes the flow field to be piece-wise constrained to an affine transformation by the triangular tessellation. This implicit regularization of the flow field imposed by the mesh warping technique is desirable because it delivers synthetic frames that blend very well with the original input frames. When the synthetic frames are inserted in between the original frames, the resulting sequence may be spatio-temporally smooth and continuous.

Due to spurious generation of highly visible blocky artifacts, prior art FRU implementations typically employ a bad frame detection module. The module analyzes the quality of each synthetic frame a posteriori and drops the frame if it is considered not acceptable. This entails a variable number of interpolated frames to be generated depending on the complexity of the content, ultimately causing a variable frame rate to be observed at the receiver. For dynamic content, such as in music and sports videos, such a FRU implementation may consume processing cycles but not deliver synthetic frames. For similar content, the mesh warping technique of embodiments of the present invention is capable of synthesizing visually plausible frames that gracefully degrade to a copy of the prior frame when motion is too extreme. This feature of present invention mitigates the need for a bad frame detector and allows embodiments of the present invention to deliver a constant frame rate to a receiver, provided that the input frame rate is constant.

FIG. 1 is a diagram of a system 10 for multimedia communication between a sender 12 and a receiver 14 over a communications path 16 according to one embodiment of the present invention. Sender 12 may be any device for communicating multimedia data signals. Receiver 14 may be any device for receiving, processing and displaying audio and video streams, such as, for example, a personal computer (PC) or other computer system having a display, a set-top box, an Internet appliance, a JAVA terminal, an information kiosk, or a digital television (DTV), although the invention is not limited in this respect. Communications path 16 may be any network or channel for coupling computing devices such as, for example, a local area network (LAN), a wide area network (WAN), an intranet, or the Internet, although the invention is not limited in this respect. The connection between sender and receiver represented by communications path 16 may be any link with a predefined maximum data bandwidth, such as, for example, modem-based dial-up connections, various types of digital subscriber line (DSL) connections, cable modem connections, wireless connections, or network interface card (NIC) based intranet connections, although the invention is not limited in this respect.

Sender 12 stores or has access to at least a portion of a digital multimedia content represented as a sequence of audio and video data signals commonly called streams. The multimedia content may be stored at a signal source site (not shown) in a main memory, a secondary memory, or a storage medium such as, for example, a CD-ROM, a digital versatile disk (DVD), or other suitable apparatus. The multimedia content may also be acquired in real-time from live audio and/or video sources such as, for example, a video camera and a microphone.

For video data signals, sender 12 sends the signals as frames to receiver 14 at a predetermined frame rate. A frame is one complete scan of the active area of a display. Receiver 14 receives the frames and performs frame rate upsampling (FRU) processing according to embodiments of the present invention to generate new frames in a video stream based on the existing frames in the stream. This effectively increases the frame rate of the video sequence for display to a user without increasing the available transmission bandwidth between the sender and the receiver, thereby providing a better quality video. Alternatively, fewer frames may be encoded and transmitted by the sender with FRU at the receiver, thereby requiring less bandwidth for a similar quality video stream.

Figure 2:
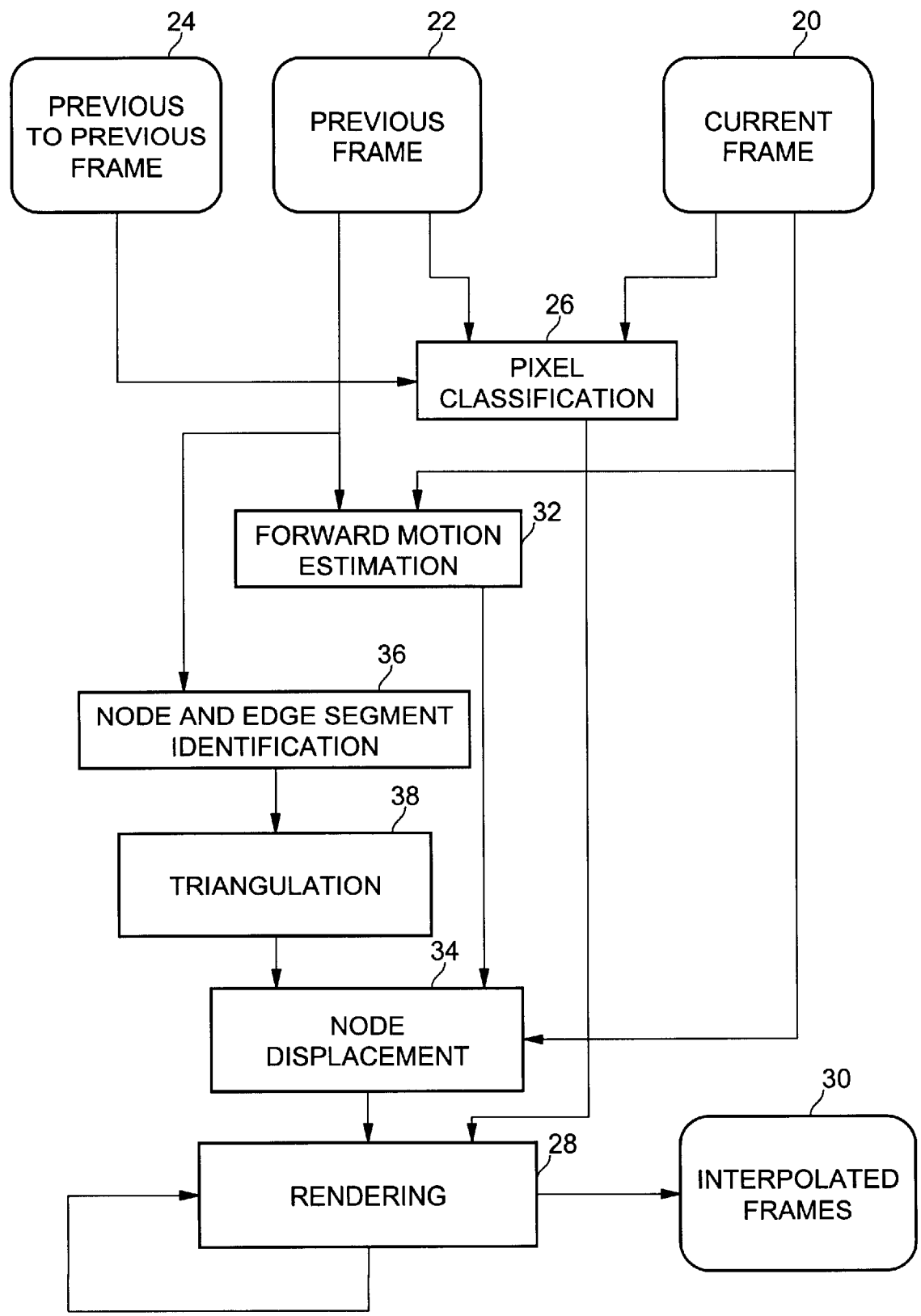
FIG. 2 is a flow diagram of frame rate upsampling processing according to an embodiment of the present invention.

FIG. 2 is a flow diagram of frame rate upsampling processing according to an embodiment of the present invention. FRU according to embodiments of the present invention comprises a frame interpolation algorithm that is pixel-based, i.e., the motion vectors ultimately used in the rendering process may differ on a pixel-by-pixel basis. This gives the present invention the capability to handle display objects performing full three dimensional (3D) motion in a scene of a video stream.

It is known in the art that mesh warping may be a viable alternative for video coding and frame interpolation, provided that a regularized motion field can be extracted from a frame and that the mesh tessellates the image into segments that belong to a single object. Embodiments of the present invention utilize a triangular mesh warping approach. The triangular mesh warping approach of the present invention provides support for transformations up to piece-wise affine mappings, thereby delivering a continuously warped version of a frame being processed.

FRU processing examines three frames of a video stream at a time: a current frame 20, a previous frame 22, and a previous to the previous frame 24. In the timeline of the video stream, the previous to the previous frame was received first by the receiver, then the previous frame, and finally the current frame. Pixels in these frames may be analyzed by pixel classification component 26 to determine if motion is present in the pixels of the frames. A "component" in embodiments of the present invention is a unit of logic to perform a particular function. A component may be implemented as software, hardware or firmware. Each pixel of previous to previous frame 24 is compared to its spatially corresponding pixel in previous frame 22 and the spatially corresponding pixel in the previous frame is compared to its spatially corresponding pixel in current frame 20. In one embodiment, pixel motion may be detected by a change in one or more of the red, green and blue pixel color values from one frame to the next frame. By comparing pixel values in the frames, each pixel may be classified as either stationary, moving, covered, or uncovered. Initially, a threshold comparison may be made to determine if a pixel has changed or not changed. If the pixel has the same values in the previous to the previous frame, the previous frame, and the current frame, then no change was detected and the pixel may be classified as stationary. If the pixel has changed between the previous to the previous frame and the previous frame, or between the previous frame and the current frame, then the pixel may be classified as moving. If the pixel has changed between the previous to the previous frame and the previous frame, but not between the previous frame and the current frame, then the pixel may be classified as covered. If the pixel has not changed between the previous to the previous frame and the previous frame, but has changed between the previous frame and the current frame, then the pixel may be classified as uncovered.

Pixel classifications may be used by rendering component 28 during generation of interpolated frames 30. Rendering component 28 uses the output of the pixel classification component 26 to identify triangles of meshes in a frame that may be trivially rendered by simple copying from a source frame (e.g., a previous frame) to a new interpolated frame. This provides processing savings and quality enhancement for static background regions within a frame. Trivially renderable triangles are those that have a large majority of stationary pixels, and thus they can be rendered as a direct copy of the previous frame into the interpolated frame.

Motion field issues for the video stream may be addressed by implementing a three layer hierarchical forward motion estimation algorithm with a weighted spiral search feature. This is contained in forward motion estimation component 32. The motion estimation may be further constrained by adding a progressive bias to the vector selection. In one embodiment, the bias may be proportional to the vector magnitude. The larger the vector, the larger the benefit it must provide to be selected. The present motion estimation algorithm delivers a spatially smooth motion field. The regularization of the motion field may contribute to the success of frame interpolation. In FRU processing, bad motion vectors that do not correspond to actual motion generate catastrophic artifacts, unlike in video coding where bad motion vectors merely lead to a reduction in compression ratio.

Node displacement estimation module 34 accepts forward motion vectors generated by forward motion estimation component 32. Forward motion vectors may be computed by forward motion estimation component 32 using a modified version of a hierarchical motion estimation algorithm. The modification of embodiments of the present invention introduces a bias towards the shorter motion vectors to increase the regularization of the motion field, especially when the scene in the frame has ambiguous textures. The motion vector search pattern and the vector selection criterion of the motion estimation algorithm were also changed. This modification may be termed "weighted spiral search". A monotonically increasing weighted spiral search enforces the rule that the further apart from the zero vector, the larger the overall benefit in terms of sum of absolute differences (SADs) a vector must deliver to be accepted as the best match.

The present FRU process is pixel-based, but focused on analyzing triangle meshes identified in the frames. The process identifies nodes of the triangular meshes and determines the motion of the nodes from frame to frame in the video stream. A triangle is defined by three points (e.g., nodes) connected by three line segments (e.g., edges). Given the estimated frame-to-frame displacement of these nodes, a mapping connecting the nodes in the previous frame and the current frame may be constructed. The node positions in the newly interpolated frame may then be estimated by a scaled version of these displacements The process comprises four main components. Node and edge segment identification component 36 identifies nodes and edge segments that make up triangular meshes in the previous frame. Triangulation component 38 links the identified nodes into triangles preserving identified edge segments. Node displacement component 34, receiving the results of forward motion estimation component 32 and triangulation component 38, determines where the nodes should be placed in a newly generated interpolated frame. Rendering component 28 generates the new interpolated frame based on the results of the node displacement component and the pixel classifications. Rendering component 28 may be repeatedly activated (without entailing additional processing in other components) to generate each additional interpolated frame between a given previous frame and a current frame.

In embodiments of the present invention, frame tessellation issues may be addressed by a node selection criterion based on refined edge maps followed by a well known Delaunay triangulation. Delaunay triangulation is disclosed at pp. 175–187 in "Computational Geometry in C", by Joseph O'Rourke, Cambridge University Press, 1993. Edge-based segmentation provides the locale for the triangulation nodes. Large regions without nodes may then be populated with periodically distributed nodes. This node selection criterion avoids artifacts on object edges where motion discontinuities might occur. It also avoids creating over-connected nodes that usually translate into elongated/thin triangles, which ultimately cause visual artifacts during warping. To complete the construction of the triangulation, the connectivity may be generated for the set of nodes via constrained Delaunay triangulation that preserves connectivity along edge segments.

Once the triangulation is in place, the temporal displacement of each node of the triangulation may be estimated between the previous and the current frames. The synthesized frames may then be rendered via image warping using scaled versions of the displacement vectors.

In a prior art system, a uniform triangulation to tessellate the reference image was used. This generated artifacts on object boundaries, because a single triangle would contain pieces of more than one object in the scene. When these objects moved with respect to each other, the affine warp would not be able to cope with the complex motion. This introduced the need to implement a node identification policy.

Node identification is the first step in the construction of a superimposed triangular mesh. The purpose of this step is to enforce that the mesh will tessellate the frame into segments that belong to a single object in the original scene.

The nodes and edge segments identified by node and edge segment identification component 36 may be input to a Constrained Delaunay triangulation to generate the connectivity of the mesh. The Constrained Delaunay algorithm generates a triangulation that preserves edge segments overriding the connectivity rules imposed by the well known Delaunay algorithm.

Figure 3:
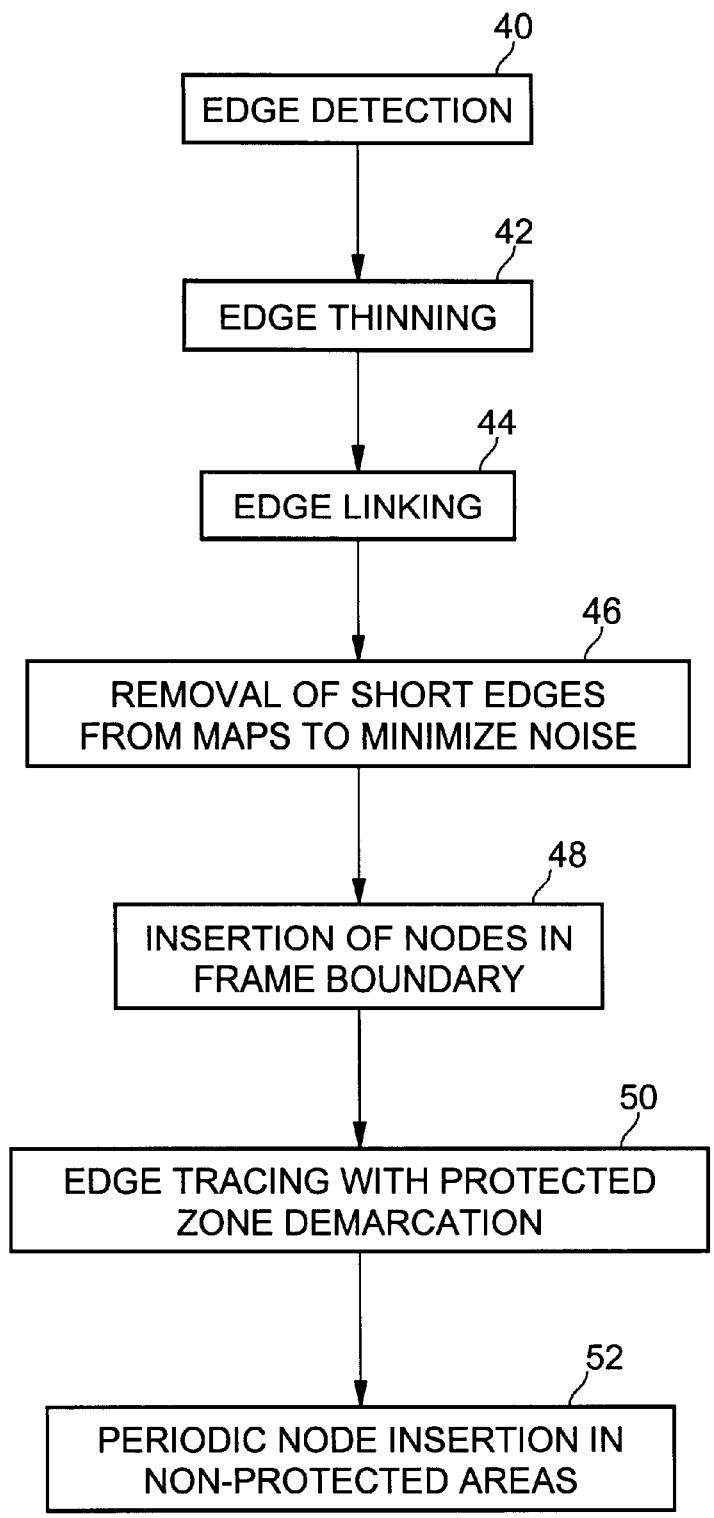
FIG. 3 is a flow diagram of node and edge segment identification processing according to an embodiment of the present invention.

In one embodiment, node and edge segment identification component 36 may be implemented by the processing shown in FIG. 3. Edge detection 40 may be used to compute edge magnitude and direction maps for edges identified in the previous frame, as well as a binary edge map via thresholding. In one embodiment, an edge detector implementing the well known Sobel technique may be used, as disclosed in "Fundamentals of Digital Image Processing", by A. K. Jain, published by Prentice Hall of Englewood Cliffs, N.J., 1989, pages 348–351. Known recursive edge thinning 42 and edge linking 44 techniques may be used to process the edge maps, as disclosed in "Computer Vision", by D. Ballard and C. Brown, published by Prentice Hall of Englewood Cliffs, N. J., 1982, pages 119–131. The processed edges are traced and short edges are deleted from the edge maps at block 46. Removal of short edges may be performed to minimize noise pixels in the interpolated frame. In one embodiment, edges with less than 15 pixels are considered short and deleted from the edge maps.

Figure 4:
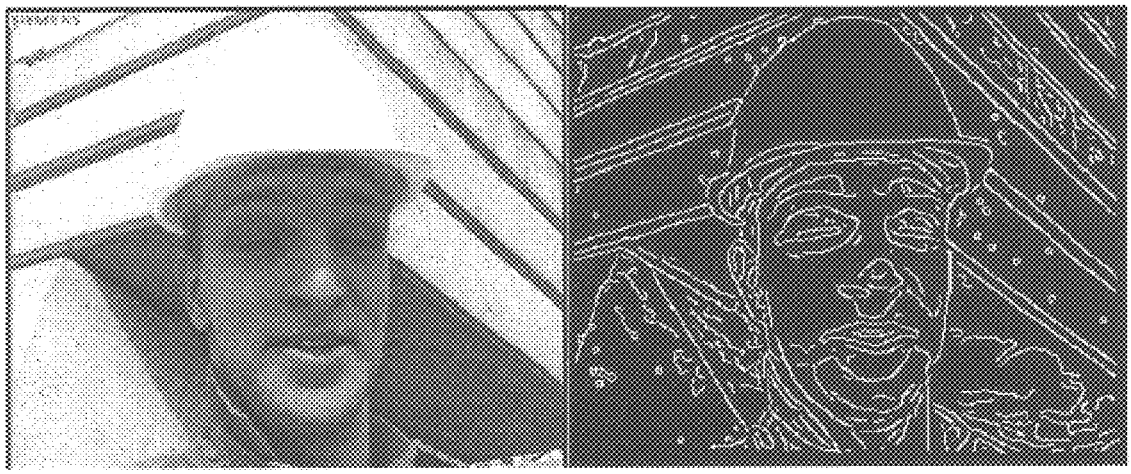
FIG. 4 is an example of a previous frame before and after edge detection, edge thinning, edge linking, and removal of short edges according to an embodiment of the present invention.

Blocks 40–46 may be used to "clean up" the edge maps such that spurious and texture edges are not considered in the node selection process. FIG. 4 is an example of a previous frame before and after edge detection, edge thinning, edge linking, and removal of short edges according to an embodiment of the present invention. The image on the left of FIG. 4 is a sample previous frame prior to edge processing. The image on the right of FIG. 4 illustrates the results of processing of blocks 40–46.

At block 48, nodes may be inserted into the frame image boundary to deal with boundary conditions. Next, at block 50 the pre-processed edge map may be recursively traced to identify both nodes and edge segments. Every time a node is identified, a protection zone around the node (in one embodiment, a 7 pixel×7 pixel rectangle may be used) is marked as already traced. The protection zone demarcation may be used to avoid the generation of nodes that are too close to each other, a problem that may exist for both triangulation and rendering. Pseudo code for recursive node identification via edge tracing in one embodiment is shown in Table I.

TABLE I

```
Edge Tracing ( )
    Set all pixels to non-traced
    For all pixels (x,y) in the edge map loop
        Trace Pixel (x,y)
    End loop
End Edge Tracing
```

The recursive processing may be peformed inside TracePixel(x,y) as shown in Table II.

TABLE II

```
Trace Pixel (x,y)
    If pixel is an edge pixel then
        If pixel is not a node already and pixel is non-traced then
            Save pixel as new node
            Mark protection zone around pixel as traced
            Trace Pixel (x + 1 ,y);
            Trace Pixel (x,y + 1);
            Trace Pixel (x-1 ,y);
            Trace Pixel (x,y-1);
            Mark pixel as traced
        End if
    End if
End Trace Pixel
```

The tracing is recursive and terminates when all pixels have been traced. This is guaranteed by the main loop that scans all pixels in the edge map.

Finally, at block 52 nodes may be inserted periodically in the non-traced areas to fill in the large areas without nodes that might exist at this point. This hole filling procedure may be used to avoid long and skinny triangles that are prone to generate artifacts during warping.

Figure 5:
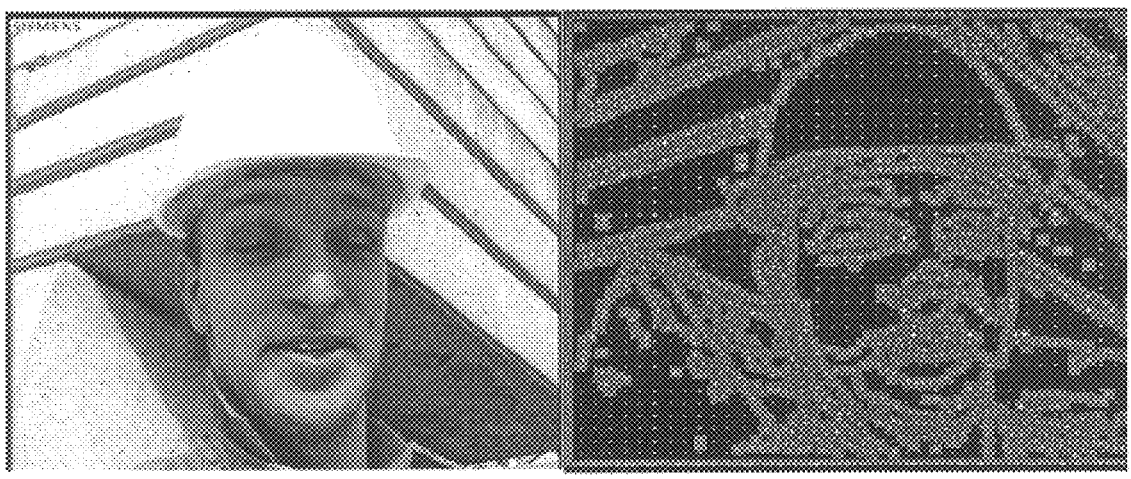
FIG. 5 is an example of a previous frame after node selection has been performed according to an embodiment of the present invention.

FIG. 5 is an example of a previous frame after node selection has been performed according to an embodiment of the present invention. The image on the left of FIG. 5 is a sample previous frame prior to edge processing. The image on the right of FIG. 5 illustrates the results of processing of blocks 48–52. The white pixels represent nodes and the gray pixels represent protection areas.

Figure 6:
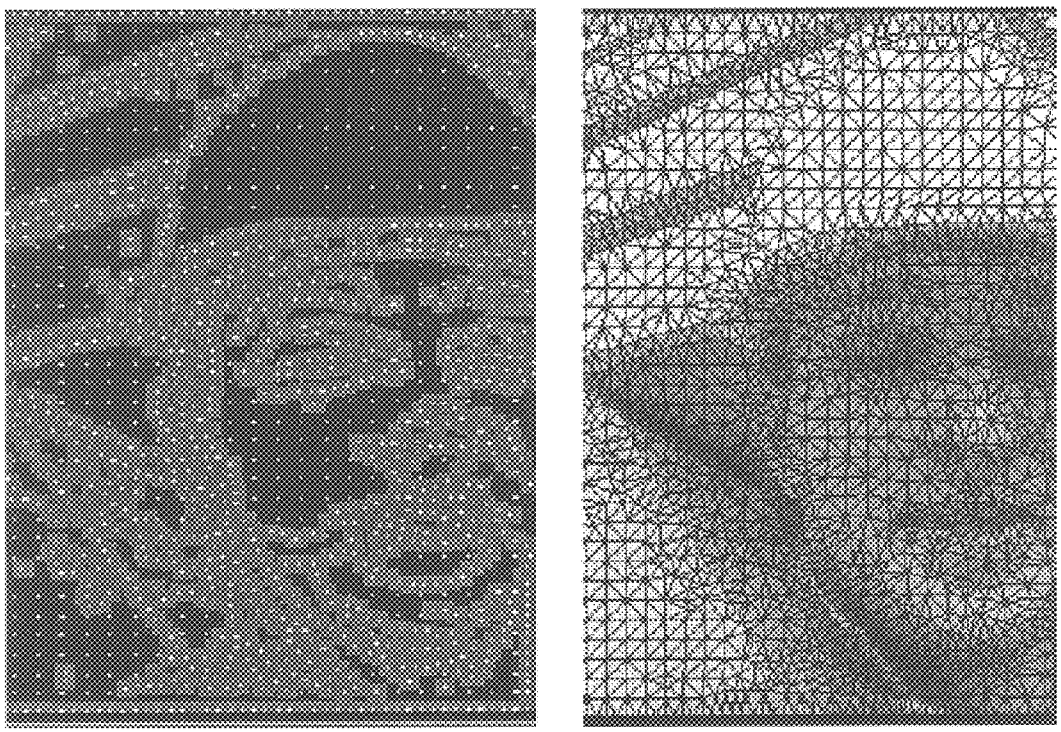
FIG. 6 is an example of node connectivity computed via Constrained Delaunay Triangulation according to an embodiment of the present invention.

In one embodiment, triangulation component 38 may be implemented using a constrained Delaunay triangulation technique. As discussed above, Delaunay triangulation is a well-known technique in computer graphics for the generation of a triangulation from a given set of selected nodes. Triangulation in this sense comprises connectivity information (e.g., which nodes are connected to a given node). In embodiments of the present invention, a constrained Delaunay triangulation algorithm that preserves edge segments may be used. Details of a suitable Delaunay triangulation algorithm may be found in "Triangle: Engineering a 2D Quality Mesh Generator and Delaunay Triangulator", by J. R. Shewchuk, in the First Workshop on Applied Computational Geometry (Philadelphia, Pennsylvania), pages 124–133, Association of Computer Machinery (ACM), May 1996; and in "Efficient Unstructured Mesh Generation by Means of Delaunay Triangulation and Bower-Watson Algorithm", by S. Rebay, in the Journal of Computational Physics, volume 106, pages 125–138, 1993. FIG. 6 is an example of node connectivity computed via Constrained Delaunay Triangulation according to an embodiment of the present invention. The image on the left of FIG. 6 is a sample previous frame prior to edge processing. The image on the right of FIG. 6 illustrates the results of processing of triangulation component 38.

After triangulation 38, the triangulation is constructed superimposed to the previous frame. The displacement that each node of the triangulation will undergo temporally between the prior frame and the current frame may now be estimated. In one embodiment, node displacement estimation 34 may be implemented as follows. The nodes may be moved around, keeping track of the displacements, while fitting a mesh with similar connectivity to the current frame. This may be implemented by resampling the regularized forward motion vector field. A bilinear interpolator that computes a weighted-average of the four vectors closest to each node location may be used.

In one embodiment, vectors resampled during node displacement estimation may be refined by a technique using hexagonal matching. In this embodiment, each node may be moved around searching for a local best fit. Each node only affects the triangles that share it. This set of triangles that share a common node is known as a nodal cavity. The hexagonal matching process may be described by the pseudo code shown in Table III.

TABLE III

Hexagonal Matching( )
    For all passes loop
        For each nodal cavity loop
            For all valid node positions within the nodal cavity loop
                Warp the nodal cavity.
                Compute the cavity SADs (between current and
                warped reference).
                If minimum SAD then
                    Update Node position in triangulation.
                End if
            End loop
        End loop
    End loop
End Hexagonal Matching Multiple passes on all nodal cavities may be used because the optimal position of a given node might change after a neighboring node moves. The warping of a cavity uses warping multiple triangles. The selection of all valid nodal positions within the cavity is a non-trivial task. Since only pixel positions within the triangles of that cavity are valid positions, this requires a great amount of tests for triangle pertinence.

To render the interpolated frames in rendering component 28, the node displacements may be scaled temporally. For multiple interpolated frames, a different scale in the interval [0,1] may be computed for each of the frames to be synthesized. The scale factor may be computed as the ratio between the temporal location of the interpolated frame 30 over the temporal location of the current frame 20 both measured with respect to the temporal location of the previous frame 22. For example, in the case of a single interpolated frame between the current and previous frames, node displacements may be scaled by half. In the case of two interpolated frames between the current and previous frames, node displacements may be scaled by one third, and so on.

In one embodiment, the synthesis of multiple frames may be implemented by the pseudo code shown in Table IV.

TABLE IV

Rendering of Interpolated Frames ( )
    For all frames to interpolate loop
        Compute scale factor and scale displacements
        Copy previous frame
        For all triangles in scaled triangulation loop
            If triangle is not trivially renderable
                Compute Affine mapping
                For all pixels in triangle loop
                      Compute corresponding pixel location (in
                    previous frame).
                    Compute pixel via bilinear resampling (of
                    previous frame).
                End loop
            End if
        End loop
    End loop
End Rendering of Interpolated Frames The previous frame may be initially copied to a synthesis buffer to enable skipping the warping of triangles that are considered "trivially renderable"; i.e. triangles composed of mostly stationary pixels. In the present invention, the output of pixel classification 26 may be used to count the number of non-stationary pixels in each triangle to determine if a triangle is "trivially renderable". A threshold of 85% may be used in some embodiments.

The knowledge of the position of the vertices of a triangle in the previous frame and on the warped triangulation, allows computation of the affine mapping that warps one triangle into the other. This mapping may then be used to compute the corresponding position in the previous frame for all pixels inside this triangle in the synthetic (i.e., interpolated) frame. With the corresponding position known, the synthetic pixel value may be computed by bilinear resampling.

In another embodiment, a more sophisticated resampling technique called Elliptical Weighted Gaussian Averaging (EWA) may be implemented. EWA is an adaptive filter used in high quality texture mapping that adjusts its taps according to the strength and direction of the affine warps. The Gaussian filter footprint is elliptical and steerable. This technique is disclosed in "Fundamentals of Texture Mapping and Image Warping", by P. S. Heckbert, master's thesis at the University of California, Berkeley, 1989. Note that the filter is constant for all pixels inside a triangle because they are subject to the same affine warp.

EWA provides protection against aliasing and Moire-effects (also known as checkerboard jaggies) that are introduced by bilinear resampling. On the other hand, EWA is based on gaussian averaging, causing some regions to appear as blurred on the synthetic frame when compared to the prior frame. In some instances this generates a video artifact on the content produced by the FRU processing that may be perceived as flickering. One solution to this problem could be to reduce the effective radius of the EWA filter and to skip EWA on trivially renderable triangles.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both.

However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 7:
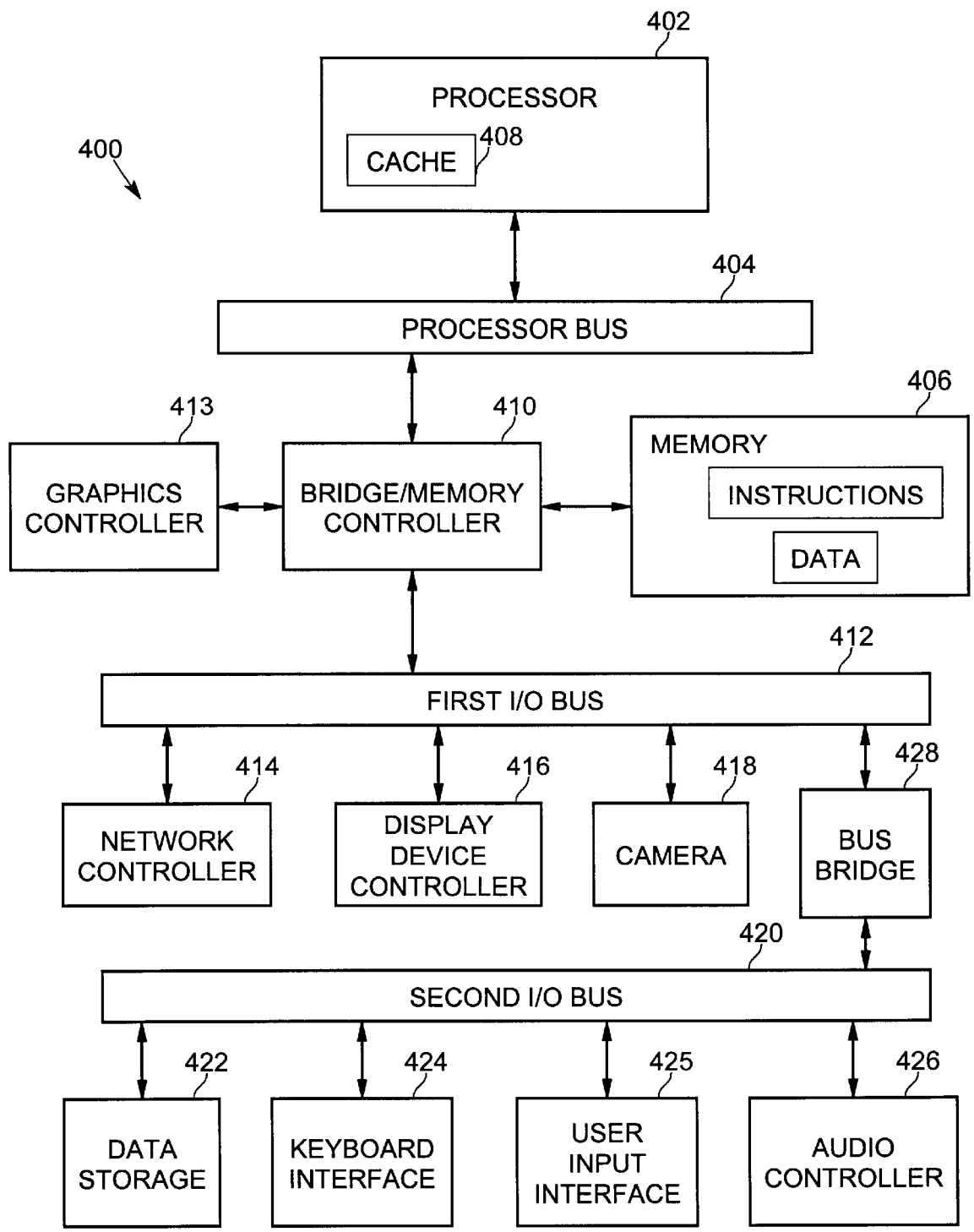
FIG. 7 is a diagram illustrating a sample system capable of being operated according to an embodiment of a method of motion compensated frame rate upsampling based on piecewise affine warping in accordance with the present invention.

An example of one such type of processing system is shown in FIG. 7. Sample system 400 may be used, for example, to execute the processing for embodiments of a method for method of motion compensated frame rate upsampling based on piecewise affine warping, in accordance with the present invention, such as the embodiment described herein. Sample system 400 is representative of processing systems based on the PENTIUM®II, PENTIUM® III, and CELERON™ microprocessors available from Intel Corporation, although other systems (including personal computers (PCs) having other microprocessors, engineering workstations, set-top boxes and the like) may also be used. In one embodiment, sample system 400 may be executing a version of the WINDOWS operating system available from Microsoft Corporation, although other operating systems and graphical user interfaces, for example, may also be used.

FIG. 7 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 7 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 7) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus to capture live events. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/0 bridge 412 to second I/0 bridge 420. The bus bridge operates to buffer and bridge data signals between the first I/O bus 412 and the second I/O bus 420.

Embodiments of the present invention are related to the use of the system 400 to perform motion compensated frame rate upsampling based on piecewise affine warping. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to perform motion compensated frame rate upsampling based on piecewise affine warping according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of motion compensated frame rate upsampling based on piecewise affine warping in accordance with the present invention, whereas memory 406 is used to store on a shorter term basis the executable instructions of embodiments of the methods for motion compensated frame rate upsampling based on piecewise affine warping in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of interpolating a new frame between a previous frame and a current frame of a video stream comprising:

classifying pixels of the previous frame and the current frame according to whether a pixel's value has changed from the previous frame to the current frame;

identifying nodes and edges of triangles present in the previous frame;

constructing a superimposed triangular mesh of the previous frame from the identified nodes and edges using constrained Delaunay triangulation to preserve edge segments;

estimating displacement of nodes in the superimposed triangular mesh from the previous frame to the current frame; and rendering the new frame based on the estimated displacement of nodes.

2. The method of claim 1, further comprising copying a plurality of pixels of a triangle from the previous frame to the new frame when a predetermined percentage of the triangle's pixels has not changed from the previous frame to the current frame.

3. The method of claim 1, further comprising rendering a plurality of new frames without repeatedly performing the identifying, constructing, and estimating actions.

4. The method of claim 1, further comprising estimating motion of pixels between the previous frame and the current frame and using the estimated motion in estimating node displacement.

5. The method of claim 4, wherein the motion estimation comprises a forward motion estimation.

6. The method of claim 5, wherein the motion estimation comprises a forward motion estimation with a weighted spiral search feature.

7. The method of claim 1, wherein rendering comprises rendering the new frame via image warping using scaled versions of estimated displacement vectors for nodes.

8. The method of claim 1, wherein identifying nodes comprises identifying nodes such that the resulting superimposed triangular mesh tessellates the previous frame into edge segments wherein each edge segment belongs to a single object of a scene represented by the previous frame.

9. The method of claim 1, further comprising inserting nodes periodically, before constructing the superimposed triangular mesh, in non-traced areas to fill in areas without nodes, thereby avoiding generation of triangles causing artifacts during estimating displacement of nodes.

10. An article comprising a machine readable medium having a plurality of machine readable instructions, wherein when the instructions are executed by a processor the instructions interpolate a new frame between a previous frame and a current frame of a video stream by classifying pixels of the previous frame and the current frame according to whether a pixel's value has changed from the previous frame to the current frame, by identifying nodes and edges of triangles present in the previous frame, by constructing a superimposed triangular mesh of the previous frame from the identified nodes and edges using constrained Delaunay triangulation to preserve edge segments, by estimating displacement of nodes in the superimposed triangular mesh from the previous frame to the current frame, and by rendering the new frame based on the estimated displacement of nodes.

11. The article of claim 10, further comprising instructions for copying a plurality of pixels of a triangle from the previous frame to the new frame when a predetermined percentage of the triangle's pixels has not changed from the previous frame to the current frame.

12. The article of claim 10, further comprising instruction for rendering a plurality of new frames without repeatedly performing the identifying, constructing, and estimating actions.

13. The article of claim 10, further comprising instructions for estimating motion of pixels between the previous frame and the current frame and using the estimated motion in estimating node displacement.

14. The article of claim 13, wherein the motion estimation comprises a forward motion estimation.

15. The article of claim 14, wherein the motion estimation instructions comprise instructions for forward motion estimation with a weighted spiral search feature.

16. The article of claim 10, wherein instructions for rendering comprises instructions for rendering the new frame via image warping using scaled versions of estimated displacement vectors for nodes.

17. The article of claim 10, wherein instructions for identifying nodes comprise instructions for identifying nodes such that the resulting superimposed triangular mesh tessellates the previous frame into edge segments wherein each edge segment belongs to a single object of a scene represented by the previous frame.

18. The article of claim 10, further comprising instructions for inserting nodes periodically, before constructing the superimposed triangular mesh, in non-traced areas to fill in areas without nodes, thereby avoiding generation of triangles causing artifacts during estimating displacement of nodes.

19. An apparatus for frame rate upsampling based on a previous frame and a current frame of a video stream comprising:

a pixel classification component to classify pixels of the previous frame and the current frame according to whether a pixel's value has changed from the previous frame to the current frame;

a node and edge identification component to identify nodes and edges of triangles present in the previous frame;

a triangulation component to construct a superimposed triangular mesh of the previous frame from the identified nodes and edges using constrained Delaunay triangulation to preserve edge segments;

a node displacement estimation component to estimate displacement of nodes in the superimposed triangular mesh from the previous frame to the current frame; and a renderer to render the new frame based on the estimated displacement of nodes.

20. The apparatus of claim 19, further comprising a forward motion estimation component to estimate motion of pixels between the previous frame and the current frame.

21. The apparatus of claim 20, wherein the forward motion estimation component comprises motion estimation according to a weighted spiral search.

22. The apparatus of claim 19, wherein the renderer renders the new frame via image warping using scaled versions of estimated displacement vectors for nodes.

23. The apparatus of claim 19, wherein the node and edge identification component identifies nodes such that the resulting superimposed triangular mesh tessellates the previous frame into edge segments wherein each edge segment belongs to a single object of a scene represented by the previous frame.

24. The apparatus of claim 19, wherein the node and edge identification component inserts nodes periodically, before constructing the superimposed triangular mesh, in non-traced areas to fill in areas without nodes, thereby avoiding generation of triangles causing artifacts during estimating displacement of nodes.

25. A method of pixel-based frame rate upsampling using piece-wise affine warping comprising:

classifying pixels of a previous frame and a current frame of a video stream according to whether a pixel's value has changed from the previous frame to the current frame;

forwardly estimating motion of pixels between the previous frame and the current frame;

identifying nodes and edges of triangles present in the previous frame;

constructing a superimposed triangular mesh of the previous frame from the identified nodes and edges using constrained Delaunay triangulation to preserve edge segments;

estimating displacement of nodes in the superimposed triangular mesh from the previous frame to the current frame based on the forward motion estimation; and rendering an interpolated frame based on the estimated displacement of nodes.

26. The method of claim 25, wherein identifying nodes and edges comprises:

detecting edges in the previous frame;

thinning edges;

removing short edges from edge maps;

inserting nodes in the previous frame's boundary;

tracing edges with a protected zone of demarcation; and inserting nodes in non-protected areas of the previous frame.

* * * * *

UNITED STATES PATENT AND TRADEMARK OFFICE
CERTIFICATE OF CORRECTION

PATENT NO.    : 6,438,275 B1
DATED         : August 20, 2002
INVENTOR(S)   : Martins et al.

It is certified that error appears in the above-identified patent and that said Letters Patent is hereby corrected as shown below:

Column 13,
Line 13, delete both occurrences of "I/0", insert -- I/O --.

Signed and Sealed this

Twenty-fifth Day of February, 2003

JAMES E. ROGAN
*Director of the United States Patent and Trademark Office*